United States Patent [19]
Skidmore

[11] Patent Number: 6,113,266
[45] Date of Patent: Sep. 5, 2000

[54] DISPOSABLE CAR SEAT TRAY

[76] Inventor: Valerie Skidmore, 210 E. Brown Apt. 131, Mesa, Ariz. 85201

[21] Appl. No.: 09/370,805

[22] Filed: Aug. 9, 1999

[51] Int. Cl.⁷ ..................................................... B65D 30/00
[52] U.S. Cl. ................................. 383/4; 383/11; 383/119; 383/207
[58] Field of Search ................... 383/4, 11, 93, 383/207, 127, 119; 229/87.05, 938

[56] References Cited

U.S. PATENT DOCUMENTS

| | | |
|---|---|---|
| 2,126,203 | 8/1938 | Miskella ........................... 383/93 |
| 2,774,531 | 12/1956 | Rosenthal ........................ 383/11 |
| 3,346,883 | 10/1967 | Ersek ........................... 383/11 X |
| 4,749,161 | 6/1988 | Falcone . |
| 4,770,107 | 9/1988 | Miller . |
| 4,887,315 | 12/1989 | Bezdek . |
| 4,932,556 | 6/1990 | Hui et al. ....................... 383/207 X |
| 4,955,981 | 9/1990 | Provost . |
| 4,985,932 | 1/1991 | Bezdek . |
| 5,062,558 | 11/1991 | Stang ........................... 383/119 X |
| 5,069,375 | 12/1991 | Flick . |
| 5,335,996 | 8/1994 | Cortopassi et al. ............. 383/207 |
| 5,457,820 | 10/1995 | Yielding . |
| 5,507,579 | 4/1996 | Sorenson ...................... 229/938 X |
| 5,530,968 | 7/1996 | Crockett . |
| 5,560,945 | 10/1996 | Geddes et al. ................. 229/87.05 X |
| 5,667,119 | 9/1997 | Florence . |
| 5,788,604 | 8/1998 | Brown et al. . |
| 5,964,534 | 10/1999 | Welles ........................ 383/207 X |

Primary Examiner—Jes F. Pascua

[57] ABSTRACT

A disposable tray for use with an infant car seat is formed from a sack containing foodstuff, such as might be provided by a fast food restaurant. The sack includes a base portion and a bottom that forms the tray. The tray can be supported on the cross bar of the car seat and is deep enough to contain food to be consumed by the infant. The sack includes opposite side panels and intermediate opposite end panels that are joined across a line of perforations. The end panels can be separated from the side panels along the perforations, and further removed from the sack at a line of perforations between the end panels and the base portion. The side panels are long enough to be wrapped around the cross bar when the base portion or tray is supported on the top surface of the bar. In one embodiment, the upper portion of the side panels overlap underneath the cross bar. At least one of the side panels includes an adhesive strip for attachment to the upper portion of the opposite side panel underneath the cross bar, thereby firmly mounting and supporting the tray on the car seat cross bar.

11 Claims, 3 Drawing Sheets

DISPOSABLE CAR SEAT TRAY

BACKGROUND OF THE INVENTION

The present invention concerns a disposable food tray, most particularly for use with an infant car seat.

In the last half of the twentieth century, people have become increasingly more mobile. As the speed of life has increased, new consumer products and services have been developed to ease the burden of or even capitalize on this hectic pace. One service in particular has enjoyed phenomenal growth since its inception in the 1950's, namely, the fast food industry. The fast food industry has quickly grown from a simple substitute for the home-cooked lunch or dinner into a mobile meal.

Increasingly, consumers, particularly American consumers, are eating meals in their vehicle. The average American eats about fifteen meals in a car. In order to address this growing phenomenon, the fast food industry has developed new food products and packaging to facilitate eating a meal in the car. Thus far, the focus has been on the convenience of the driver.

This proliferation of on-the-road eating is perhaps most widely driven by children and infants. It can be surmised that for every meal eaten by a child in an automobile, there are at least five fast food snacks consumed. As any parent or child care provider knows, the notion of the in-car snack or meal for an infant can be a messy proposition. Typically, the fast food is provided in a sack 10, as depicted in FIG. 1. The foodstuff may include a sandwich 12 of some type and french fries 14, each in an individual package. An infant I is seated in a car seat C within a vehicle as shown in FIG. 2. The car seat includes a cross bar B extending across the front of the seat. When the infant I is consuming the foodstuff, the sandwich 12 and french fries 14 are usually free standing in the child's lap or somewhere within the car seat. In many cases, this manner of feeding a fast food meal to an infant in the car is simply a recipe for disaster.

In response to this problem, certain devices have been developed to catch loose food that inevitably escapes consumption by infant. For example, U.S. Pat. No. 5,457,820 shows a bib that is attached to the car seat bar at one end and around the neck of the infant at the other end. Another approach is taken in U.S. Pat. No. 4,770,107 in which a portable travel tray is connected between the infant car seat and the passenger seat directly ahead.

These approaches can help alleviate some of the mess and frustration associated with on-the-road infant meals. However, in each case they require a product that must be kept handy in the event that a meal or snack is required in the vehicle. Moreover, none of these approaches provides a disposable solution to the problem. Finally, all of the prior devices require the purchase of a separate consumer item.

Therefore, there remains a need for a disposable food tray that is particularly adapted for use with an infant car seat. Since the volume of usage may be fairly high, the disposable tray must also be extremely inexpensive and economical.

SUMMARY OF THE INVENTION

The solution to this problem rests in the fast food packaging itself. In accordance with the present invention, the disposable car seat tray is formed from the food sack provided by the fast food business. In most fast food restaurants, the ordered food is provided to the purchaser in a separate snack. According to the present invention, this snack can be subsequently manipulated by the consumer to form a disposable tray that can be readily mounted to the cross-bar of an infant car seat.

In one embodiment of the invention, the food sack includes a pair of opposite side panels and intermediate opposite end panels. The sack includes a base portion that remains intact after manipulation of the sack, and which serves as the food tray. The sack includes a line of perforations between the side panels and the end panels extending upward from the base portion of the sack. In addition, a second line of perforations are preferably formed between the base portion and a lower edge of the end panels.

According to the invention, the side panels have a length sufficient to be wrapped around the cross-bar when the base portion, or tray, is supported on the upper surface of the bar. In the preferred embodiment, the side panels are long enough to overlap each other underneath the cross-bar. In an alternative embodiment, the side panels need not overlap, but must be sufficiently long to wrap at least partially around the bar.

In another feature of the invention, at least one of the side panels includes an attachment pad preferably disposed at an upper edge of the side panel. In one embodiment, the attachment pad includes an adhesive layer with a removable cover tape. The adhesive layer is formed of a material adapted to firmly adhere to the sack material. In an alternative embodiment, the adhesive layer is configured for removable attachment to the underside of the infant seat cross-bar itself.

In the use of the food sack of the present invention, the end panels are removed by tearing the sack along the perforations. With the end panels removed, the opposite side panels are then free to be folded outwardly relative to the base portion of the food sack when the base portion rests on the cross-bar of the infant car seat. At this point, the side panels are then folded or wrapped around the cross-bar and attached to each other by way of the attachment pads.

In this manner, the base portion acts a food tray that is firmly connected to the car seat, and particularly to the cross-bar of the car seat. The infant's meal can then be placed within the base portion, or tray, for consumption by the child. When the infant has finished eating, the modified food sack can be readily removed from the car seat by tearing across one of the side panels or peeling the panels apart at the attachment pads. The base portion continues to act as a tray or container for the unconsumed food or as a container for picking up pieces of food invariably left by the infant. The entire sack can then be properly disposed of as refuse.

It is one object of the present invention to provide a disposable food tray for use with an infant car seat. Another object is to provide such a tray that is economical and easy to use.

One benefit of the present invention is that it does not require the purchase of an additional child product. A further benefit resides in features of the invention that make it readily usable by the fast food restaurant itself.

These and other objects of the invention will become apparent from the following written disclosure and accompanying figures.

DESCRIPTION OF THE PREFERRED EMBODIMENTS

Figure 1:
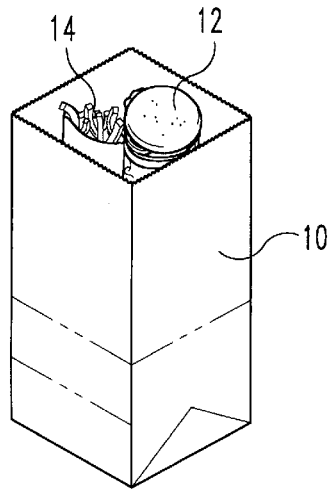
FIG. 1 is top perspective view of a food sack that might be typically received from a fast food restaurant.
Figure 2:
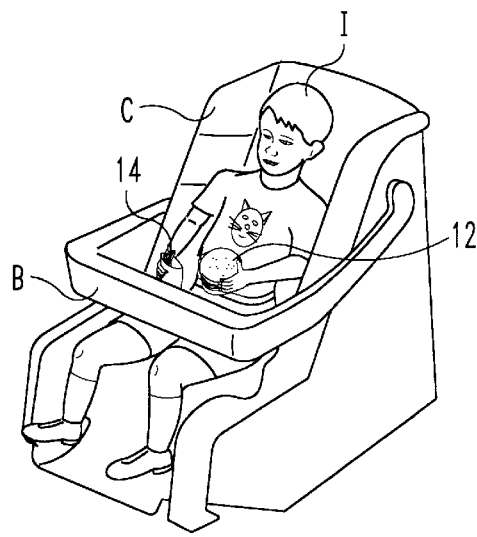
FIG. 2 is a top perspective view of an infant in a car seat consuming a meal in a typical fashion.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

In a preferred embodiment of the invention, a food sack 20 is provided that can be formed of the typical sack material used to convey fast food to the consumer. The food sack 20 is preferably dimensioned like the typical fast food sack, and otherwise functions in the same manner to contain the recently purchased foodstuff.

The food sack 20 of the present invention includes a base portion 22 formed upward from the bottom 23 of the sack. Projecting upward from the base portion are a first side panel 25, an opposite second side panel 26, and intermediate opposite end panels 28. It is understood that each of the panels form the side walls of the food sack in its normal configuration provided by the fast food restaurant.

The sack 20 further includes a line of side perforations 30 at the edge between each side panel 25, 26 and each end panel 28. In other words, the perforations run along each vertical edge of the food sack, starting at the top of the base portion 22. The perforations do not extend into the base portion. However, lower perforations 32 can be provided along the upper edge of the base portion 22 along the width of each of the end panels 28. As can be discerned from FIG. 3, the side perforations 30 and lower perforations 32 provide means for removing the opposite end panels 28 from the food sack 20.

Figure 4:
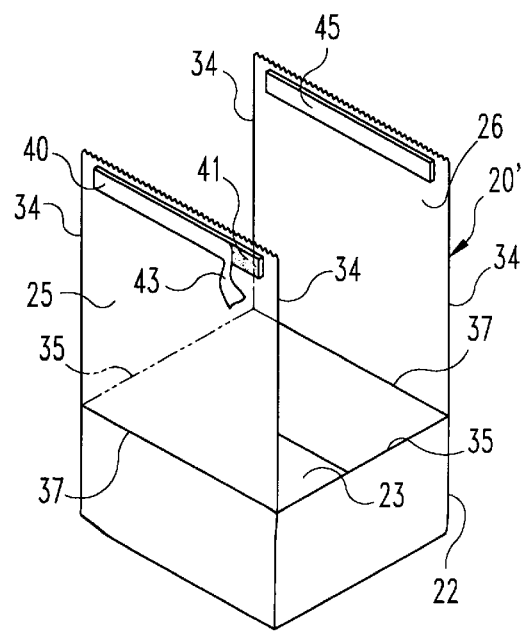
FIG. 4 is a top perspective view of the food sack shown in FIG. 3 after the snack has been manipulated according to the present invention.

This step is depicted in FIG. 4, resulting in the modified food sack 20'. As can be seen in the figure, the end panels 28 have been removed by tearing along the side perforations 30 and lower perforations 32. In this configuration, the food sack 20' includes free side edges 34 at the edges of each side panel 26 and 26, as well as free edges 35 at the top edge of the base portion 22.

Alternatively, the end panels need not be completely removed from the sack 20', instead remaining attached at one of the lines of perforations. For instance, the end panels can remain attached to the base portion 22 at the intermediate line of perforations 32. It is important, however, that the side panels 25, 26 are free to be folded outward relative to the base portion.

Figure 5:
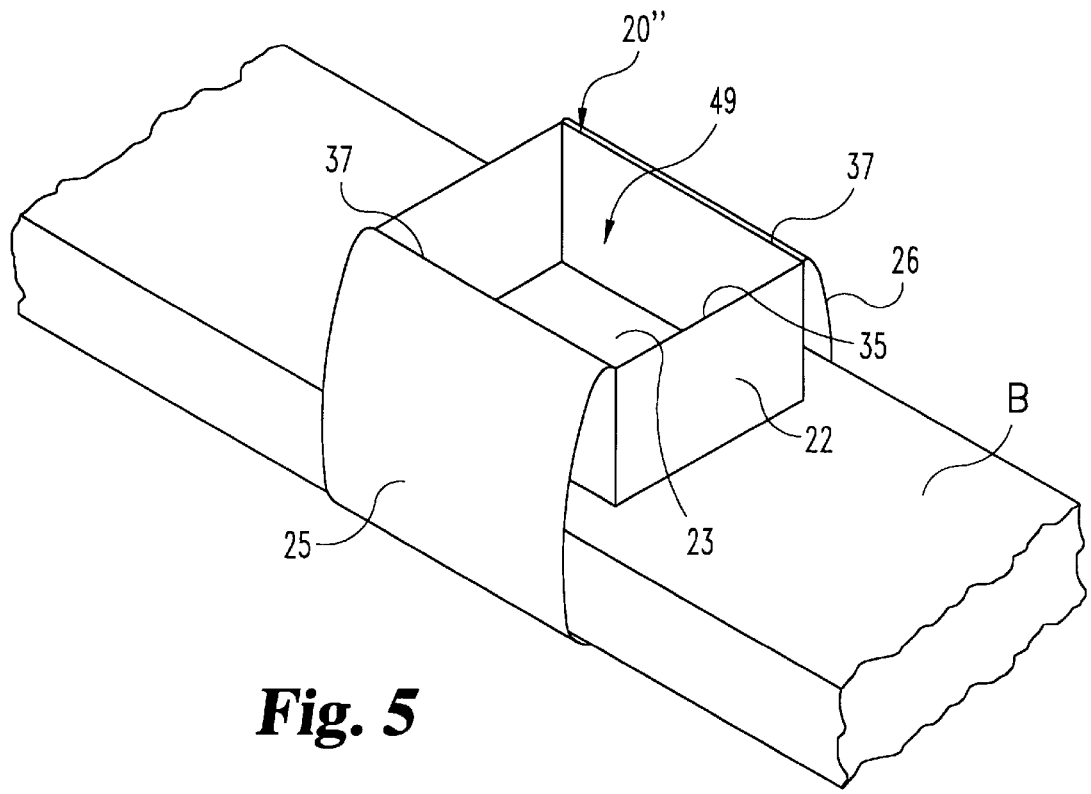
FIG. 5 is a top perspective view of the food sack shown in FIGS. 3 and 4 mounted to the crossbar of an infant seat.
Figure 6:
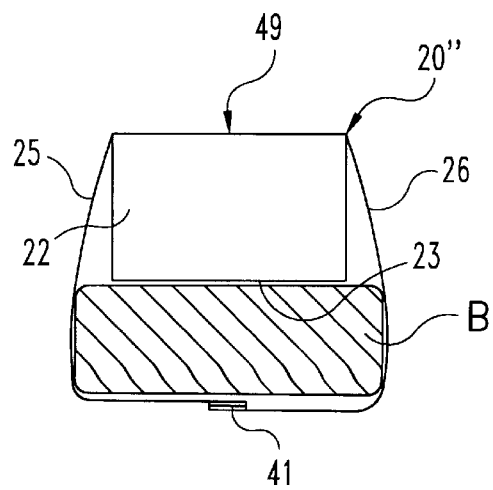
FIG. 6 is an end partial cross-sectional view of the food sack mounted to the car seat crossbar as shown in FIG. 5.

Referring now to FIGS. 5 and 6, it can be seen that the two side panels 25 and 26 can be folded along crease line 37 at the upper edge of the base portion 22. The further modified food sack 20" is then usable as a food tray. The side panels 25 and 26 are folded around the cross-bar B of the car seat. The bottom 23 of the sack rests directly on the upper surface of the cross-bar B. In the preferred embodiment, the side panels have a length sufficient for the panels to overlap underneath the cross-bar.

Figure 3:
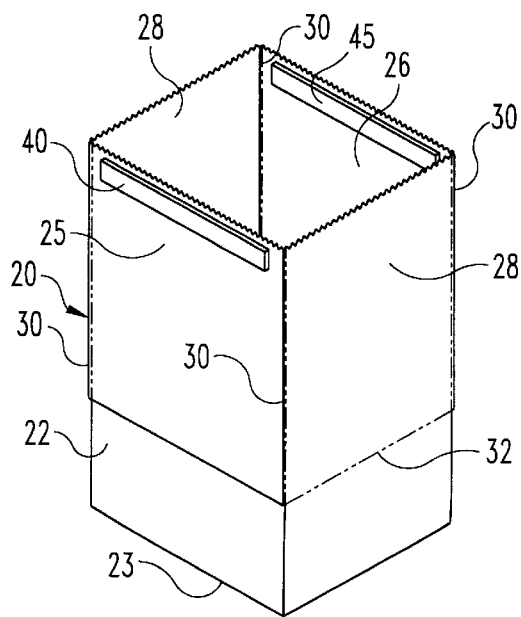
FIG. 3 is a top perspective view of a food sack according to one embodiment of the present invention.

In order to secure the food sack 20" to the cross-bar B, the invention further contemplates attachment means 40, which can include an attachment pad affixed to at least one of the side panels, such as side panel 25 as shown in FIGS. 3 and 4. In one specific embodiment, the attachment pad 40 can include an adhesive layer 41 that is applied to the panel 25. A cover tape 42 protects the adhesive layer until the food sack is to be used as a disposable tray. At that time, the tape 43 can be easily removed to expose the adhesive layer 41. With the adhesive layer exposed, the two side panels 25 and 26 can be attached underneath the cross-bar B. In this configuration, the base portion 22 is firmly supported on the cross bar B. In this position, the base portion 22 provides an open food compartment 49 that can be used to contain the snack or meal for the infant.

In the illustrated embodiment, the attachment pad 40 is attached to the outside upper edge of the side panel 25. Alternatively, an attachment pad can be provided at the interior of the food sack, such as optional attachment pad 45 on side panel 26. Regardless of the positioning of the attachment pad, whether pad 40 or pad 45, the adhesive layer can be easily positioned to contact and adhere to the opposite side panel. As a further option, both attachment pads 40 and 45 can be provided on the same sack to provide a more solid connection between the side panels, and therefore a more substantial support for the base portion 22 mounted on the cross-bar B.

Alternatively, an attachment pad, such as pad 40 can be provided on the outside of both side panels. In this instance, the adhesive layer 41 for each of the attachment pads would be configured to removably adhere to the underside of the cross-bar B. Preferably, however, the side panels 25 and 26 are sufficiently long to overlap underneath the cross-bar B with the base portion 22 sifting on the top of the bar.

In an alternative embodiment, the side panels are only long enough to reach around the cross-bar. In this instance, both side panels may include an attachment strip. The adhesive layer of each strip is then formed of a material that permits removable adhesion to the cross-bar without disrupting the material of the cross-bar.

The food sack 20 according to the present invention can be easily substituted for the typical food sack provided by a fast food establishment. Preferably, the sack 20 can be used to carry a children's meal of the variety frequently provided by the most popular fast food restaurants. Optionally, the sack can be made available on request, with the typical food sack being provided in all other instances.

Figure 7:
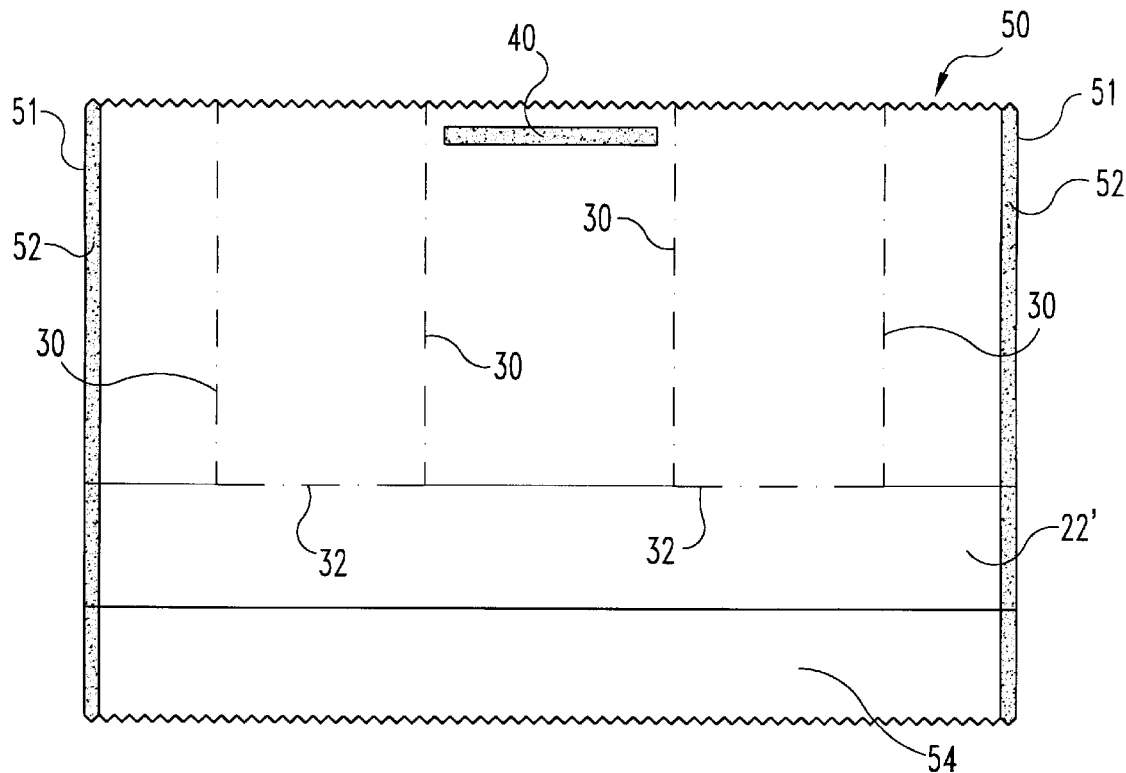
FIG. 7 is a top plan view of a sheet of material to be formed into the food sack illustrated in FIGS. 3–5.

The disposable food tray as implemented through the food sack 20 of the present invention can be easily manufactured with only slight modification to the typical process for manufacturing sacks and bags. More particularly, a blank for manipulation in a sack forming process can include a sheet 50 made of sack or bag material laid out in the manner shown in FIG. 7. The sack 20 can be formed from the sheet 50 using well-known sack manufacturing processes. Thus, the sheet will have a side wall seam edge 51 and a side wall overlap portion 62 at the opposite edges of the sheet. When the bag is formed into its characteristic rectangular shape, the seam edges 51 overlap each other at the overlap portion 52 and are adhered together. The sheet 50 further includes a bottom portion 54 that is folded and adhered in a known manner to form the bottom 23 of the sack.

Thus far, the blank sheet 50 and its elements are according to known sack manufacturing approaches. In accordance with the present invention, the perforation lines 30 and 32 can be formed in the sheet in the pattern shown in FIG. 7. The perforations can be created using any known technique suitable for providing tear lines in sack material. It is understood that the perforations must be sufficient to permit easy removal of the end panels from the food sack 20. At the same time, the perforations cannot be so numerous as to disturb integrity of the sack 20 when used to simply carry or support a child's meal within.

As a further modification of the process, the attachment pad 40 can be added to the sack sheet 50 prior to forming the sheet and to the food sack. Alternatively, the attachment pad can be added after the sack has been fully formed. The attachment pad can be of a variety of known configurations suitable for attaching typical sack material, such as paper. For example, the attachment pads can be in the form of double-side tape with a cover strip over one adhesive side. As a further option, the attachment pad can constitute a adhesive layer applied directly to the sack material, with a cover strip subsequently laid over the adhesive layer.

Figure 8:
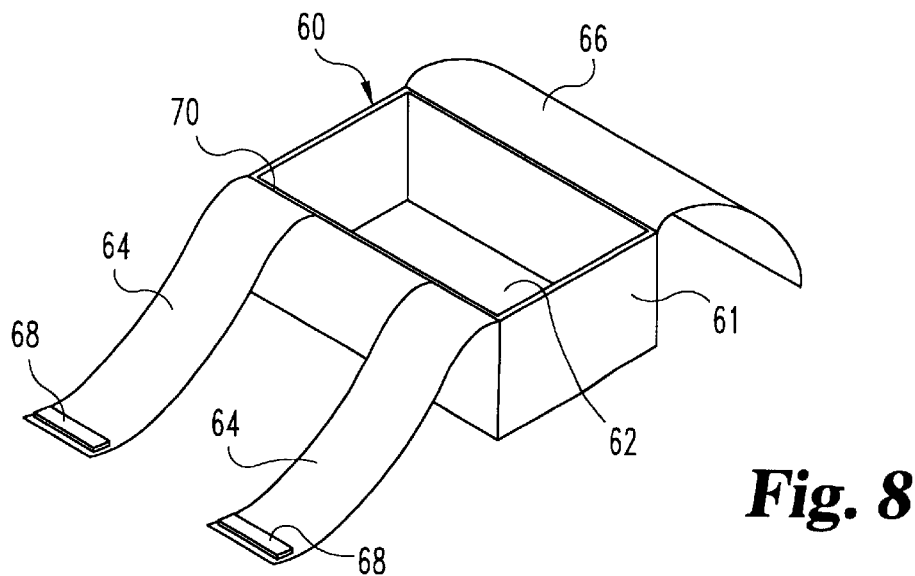
FIG. 8 is a top perspective view of a food sack according to an alternative embodiment of the invention.

In a further embodiment of the invention, a food sack 60 can be provided as shown in FIG. 8. This food sack is similar to the sack 20 in that it includes a base portion 61 rising from the bottom 62 of the side. This base portion serves as the tray for containing the infant's food. In one modification from the previous embodiment, the sack is perforated so that one of the side panels produces a pair of side strips 64 separated by a removable central portion. The other side panel 66 can remain intact. With this configuration, an additional line of perforations is required to allow removal of the central portion between the two side strips 64. Attachment pads 68 can be provided on each of the side strips 64, in a manner similar to that disclosed above. The independent side strips 64 provide a means for wrapping around an irregular contour of the cross-bar B of the infant seat C. The side strips 64 otherwise function in the same manner as the side panel 25 of the previous embodiment.

In a further modification, the food sack 60 can include a reinforcement wall 70 around the perimeter of the base portion 61. This reinforcement wall 70 can be formed by adding an additional layer of material to the base portion region 22' shown in FIG. 7. In that instance, when the sheet is folded into the sack configuration, the reinforcement wall 70 will appear at the perimeter of the base portion. This reinforcement wall 70 can further constitute an additional layer of the sack sheet material, or can be of some other form. For instance, the reinforcement wall 70 can be a thin plastic layer that not only provides additional support for the walls of the base portion 61, but also acts as a sort of barrier to prevent grease from fried foods soaking through the food sack 60.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A disposable tray for an infant car seat having a cross bar spanning the seat portion, comprising:

a sack formed of a flexible material, said sack including:
a base portion defining a container and having a bottom wall, a pair of opposite side walls, and a pair of opposite end walls intermediate said opposite side walls;
opposite side panels extending from the opposite side walls and having an upper edge and a lower edge integral with said pair of opposite side panels, each of said opposite side panels having a length between said lower edge and said upper edge configured so that an upper portion adjacent said upper edge of each side panel can be wrapped around the underside of the car seat cross bar when said base portion is supported on the top of the cross bar; and
opposite end panels extending from the opposite end walls and disposed between said pair of opposite side panels and integral therewith at a line of perforations configured to permit separation of each end panel from each side panel; and
attachment means, at said upper portion of at least one of said opposite side panels, for attaching said at least one side panel to another surface.

2. The disposable tray according to claim 1, wherein said flexible material is paper.

3. The disposable tray according to claim 1, wherein said attachment means includes an adhesive strip.

4. The disposable tray according to claim 3, wherein said attachment strip includes a cover tape removably mounted on said adhesive strip.

5. The disposable tray according to claim 1, wherein said sack further defines a line of perforations between said opposite end panels and said base portion, whereby said end panels can be completely separated from said sack at said perforations.

6. The disposable tray according to claim 1, wherein at least one of said opposite side panels includes a central portion between a pair of side strips and separable therefrom and from said base portion at a line of perforations.

7. The disposable tray according to claim 1, wherein said attachment means includes an adhesive strip configured for removable attachment to the underside of the cross bar.

8. The disposable tray according to claim 1, wherein said length of each of said opposite panels is configured so that said upper portion of each side panel overlaps when wrapped around the cross bar.

9. The disposable tray according to claim 8, wherein said attachment means is configured for attaching said at least one side panel to said upper portion of the opposite panel.

10. The disposable tray according to claim 1, wherein at least one pair of said pair of opposite side walls and said pair of opposite end walls of said base portion is reinforced.

11. The disposable tray according to claim 10, wherein said at least one pair includes a layer of reinforcement material affixed thereto.

* * * * *

UNITED STATES PATENT AND TRADEMARK OFFICE
CERTIFICATE OF CORRECTION

PATENT NO. : 6,113,266

DATED : Sep. 5, 2000

INVENTOR(S) : Valerie Skidmore

It is certified that error appears in the above-identified patent and that said Letters Patent is hereby corrected as shown below:

Col. 3, line 55
      replace "panel 26"
    with --panel 25--
    Col. 4, line 64
      replace "62"
    with --52--

Signed and Sealed this

Twenty-fourth Day of April, 2001

*Attest:*

NICHOLAS P. GODICI

*Attesting Officer*    *Acting Director of the United States Patent and Trademark Office*